(12) United States Patent
Tuero

(10) Patent No.: US 8,638,552 B1
(45) Date of Patent: Jan. 28, 2014

(54) DOCKING STATION FOR A MACINTOSH LAPTOP COMPUTER

(76) Inventor: Erick N. Tuero, Saugus, CA (US)

( * ) Notice: Subject to any disclaimer, the term of this patent is extended or adjusted under 35 U.S.C. 154(b) by 257 days.

(21) Appl. No.: 13/110,657

(22) Filed: May 18, 2011

(51) Int. Cl.
*G06F 1/16* (2006.01)
*H05K 5/00* (2006.01)
*H05K 7/00* (2006.01)

(52) U.S. Cl.
USPC .................................... 361/679.41

(58) Field of Classification Search
None
See application file for complete search history.

(56) References Cited

U.S. PATENT DOCUMENTS

| | | | | |
|---|---|---|---|---|
| 5,212,628 | A * | 5/1993 | Bradbury | 361/679.44 |
| 5,305,180 | A * | 4/1994 | Mitchell et al. | 361/679.37 |
| 5,369,549 | A * | 11/1994 | Kopp et al. | 312/263 |
| 5,604,663 | A * | 2/1997 | Shin et al. | 361/679.43 |
| 5,687,060 | A * | 11/1997 | Ruch et al. | 361/679.43 |
| 6,061,233 | A | 5/2000 | Jung | |
| 6,185,095 | B1 * | 2/2001 | Helot et al. | 361/679.44 |
| 6,208,508 | B1 * | 3/2001 | Ruch et al. | 361/679.55 |
| 6,280,212 | B1 * | 8/2001 | Nguyen et al. | 439/157 |
| 6,309,230 | B2 * | 10/2001 | Helot | 439/131 |
| 6,587,348 | B2 * | 7/2003 | Kondo | 361/741 |
| 6,626,686 | B1 * | 9/2003 | D'Souza et al. | 439/131 |
| 6,643,127 | B1 * | 11/2003 | Richardson | 361/679.4 |
| 6,646,866 | B2 * | 11/2003 | Kao | 361/679.26 |
| 6,833,988 | B2 * | 12/2004 | Kamphuis et al. | 361/679.41 |
| 7,088,578 | B1 * | 8/2006 | Gruby et al. | 361/679.56 |
| 7,487,940 | B2 * | 2/2009 | Saez et al. | 248/176.1 |
| 7,502,225 | B2 * | 3/2009 | Solomon et al. | 361/679.41 |
| 7,679,902 | B2 | 3/2010 | Thompson | |
| 7,684,185 | B2 * | 3/2010 | Farrugia | 361/679.41 |
| 7,755,890 | B2 * | 7/2010 | Rui et al. | 361/679.55 |
| 8,164,222 | B2 * | 4/2012 | Baarman | 307/104 |
| 8,289,698 | B1 * | 10/2012 | Walder | 361/679.41 |
| 2001/0000447 | A1 * | 4/2001 | Thompson | 361/686 |
| 2002/0135977 | A1 * | 9/2002 | Yin et al. | 361/686 |
| 2004/0223293 | A1 * | 11/2004 | Nakano et al. | 361/679 |
| 2005/0162824 | A1 * | 7/2005 | Thompson | 361/686 |
| 2009/0284216 | A1 * | 11/2009 | Bessa et al. | 320/101 |

* cited by examiner

*Primary Examiner* — Jinhee Lee
*Assistant Examiner* — Xanthia C Cunningham

(57) ABSTRACT

A docking station for a Macintosh laptop computer having a receiving sleeve and a base plate, the receiving sleeve including a spring lever to guide the inserted laptop to interconnect with a series of specifically arranged connecting heads, said connecting heads configurable to a specific Macintosh laptop computer upon a parallelepiped contact plate disposed within the receiving sleeve. The spring lever is a cylindrical member having a first and second finger projected radially therefrom that rotate the cylindrical member when a laptop is inserted into the receiving sleeve, in turn rotating a third finger upward which engages an eject button. A Macintosh laptop computer is thus rapidly and easily interconnected with peripheral devices by placement into the receiving sleeve.

6 Claims, 4 Drawing Sheets

DOCKING STATION FOR A MACINTOSH LAPTOP COMPUTER

BACKGROUND OF THE INVENTION

Various types of docking stations for computer laptops are known in the prior art. However, what is needed is docking station for a Macintosh laptop computer that includes a receiving sleeve into which a Macintosh laptop computer can be placed, vertically oriented so that a plurality of connections are rapidly made to the plurality of data ports on a Macbook pro style laptop computer. The docking station has a contact plate with a plurality of connecting heads disposed thereon. The contact plate is devised to enable specific configurations of the connecting heads there arranged, as may be required to interconnect with different models of Macintosh laptop computers available to consumers.

When inserted into the receiving sleeve, the weight of the laptop computer engages with a spring lever which guides the laptop computer to interconnect with the contact plate disposed within the sleeve. The contact plate is configurable to house an interchangeable series of male connection heads that insert into the data ports located on the laptop computer.

When the laptop computer engages the spring lever into a depressed position, an ejection button, located on an exterior surface of the receiving sleeve, is raised into an engaged position. When depressed, the ejection tab raises the spring lever and the laptop is guided into a released position, the male connection heads precisely disconnected from the data ports, and the laptop is easily retrieved from within the sleeve.

In this manner, a Macintosh laptop computer is easily placed within the sleeve and connection made to power the computer. Additional connections are made to peripheral devices such as are desired, the peripherals controlled via the laptop computer data ports, said data ports including USB, Ethernet, miniDVI, and audio ports.

A laptop computer is thus easily interconnected to a home or office workstation, and all data on the computer may be retrieved via the peripheral devices adorning said home or workstation, allowing rapid access to—and deployment of—data, as desired.

The present invention is specific to Macintosh laptop computers.

FIELD OF THE INVENTION

The present invention relates to a docking station for a Macintosh laptop computer, and more particularly, to docking station for a Macintosh laptop computer that includes a receiving sleeve connected to a base plate, a spring lever that guides the computer placed within the sleeve to interconnect with a contact plate, the contact plate having a series of interchangeable connecting heads disposed thereon, which series of connecting heads is configured to connect with the data ports on a Macintosh computer. The connection heads interconnect with a power source and with a series of peripherals at the home or office whereby a Macintosh laptop computer can be connected with, for example, a printer, a monitor, a keyboard, a mouse, speakers, a camera, or other peripherals as controlled via, for example, a laptop USB, Ethernet, mini DVI, VGI, S-Video, Firewire and audio ports. The contact plate is configurable to house different connection heads as desired to interconnect with specific Macintosh laptop computers and the different models available to consumers.

As such, a person may use a Macintosh laptop computer to the effect of a computer tower, which hard drive is accessible via a series of peripherals, and, at the same time, disconnect the laptop computer to take elsewhere with the same data intact, as desired.

SUMMARY OF THE INVENTION

The general purpose of the docking station for a Macintosh laptop computer, described subsequently in greater detail, is to provide a docking station for a Macintosh laptop computer which has many novel features that result in a docking station for a Macintosh laptop computer which is not anticipated, rendered obvious, suggested, or even implied by prior art, either alone or in combination thereof.

Among other preferred uses, Macintosh computers have long been the preferred device for professionals working with graphics, layout, editing, film, and design. Such professions benefit from large displays used to assist interaction and precision in their work. A computer docking system devised specifically for Macintosh laptop computers may thus be useful for professionals to simply interconnect their laptops with an array of peripherals common to computer towers, enabling a more comfortable arrangement, interaction, and display of data housed within the laptop hard drive.

As computing power continues to increase through innovation in the industry, high powered computers are becoming more and more powerful at smaller and smaller sizes. Such a docking system as described in this specification will be useful for interconnecting a laptop with peripherals in the home or office. While interconnecting the peripherals of a workstation is anticipated to be a common use of the present device, other applications exist.

For example, with computers—and especially Macintosh computers—growing in popularity for use coordinating entertainment in the home, my docking station for a Macintosh laptop computer, as herein presented, will make it easy for a person to interconnect their computer with a system of peripherals throughout a household, the Macintosh laptop acting as a hub through which multiple data channels may be enjoyed, including (but not limited to) televisions and video, music systems and audio arrays, computer monitors, keyboards, mice, cameras, internet stations, recording studios, digital picture frames, blue tooth devices, and access to the cloud or a remote server via the Internet.

The present device, therefore, acts to centralize peripheral access to data stored on, or accessed by, a single Macintosh laptop hard drive.

The present device, then, has a receiving sleeve, a base plate situated on a rubber pad, a spring lever, a contact plate, a rear opening, and an eject button.

The receiving sleeve is a section of a parallelepiped cavity, sized appropriate to hold a laptop computer in a vertical orientation. The receiving sleeve is lined with felt or another fabric to protect the finish of the laptop placed therein. Upon insertion into the sleeve, the laptop engages a spring lever which guides the laptop precisely to the connection heads located on the contact plate.

As the spring lever is depressed, the eject button is raised to a depressible engaged position. When this eject button is depressed, the spring lever is engaged to raise the laptop, guiding a smooth and precise release of the connection heads from the data ports.

It is important to note that the contact plate disposed within the receiving sleeve is configurable among connection heads to interconnect with a specific Macintosh computer, and may be alternately arranged and configured to interconnect different data ports as desired, tailored to an individual laptop and the peripheral components interconnected to the laptop through the present device.

The wires that interconnect the connection heads with their corresponding peripheral device are centrally disposed from an aperture located in the rear of the docking station enabling tidy arrangement of the same as distributed from the docking station to each peripheral, as desired.

The present docking station for a Macintosh laptop computer enables the rapid interconnection of the laptop to a plurality of peripherals, and an efficient disconnection of the same, by simply inserting and ejecting the laptop therefrom.

Thus has been broadly outlined the more important features of the docking station for a Macintosh laptop computer so that the detailed description thereof that follows may be better understood and in order that the present contribution to the art may be better appreciated.

Objects of the present docking station for a Macintosh laptop computer, along with various novel features that characterize the invention are particularly pointed out in the claims forming a part of this disclosure. For better understanding of the docking station for a Macintosh laptop computer, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
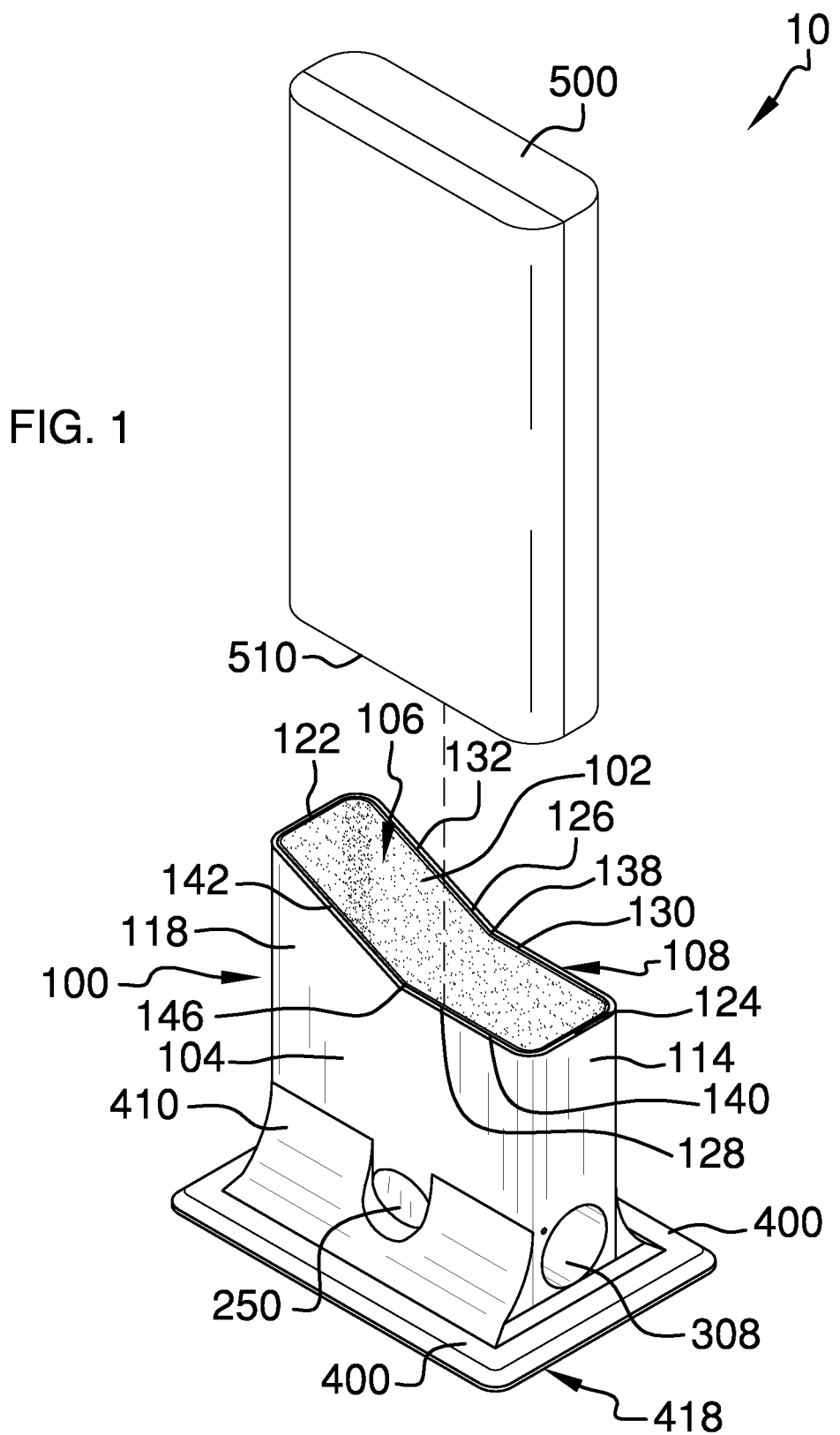
FIG. 1 is an isometric view.
Figure 2:
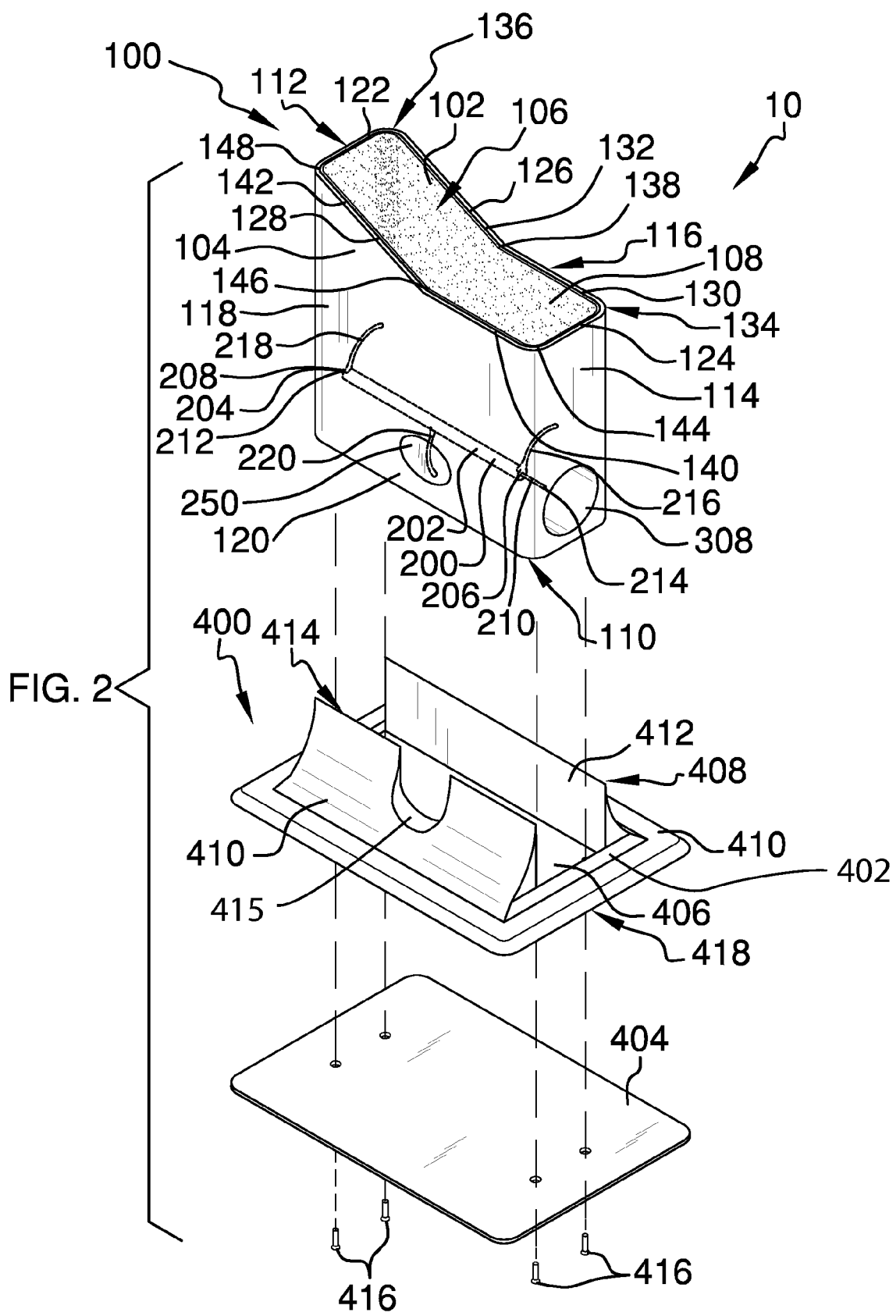
FIG. 2 is an exploded view.
Figure 3:
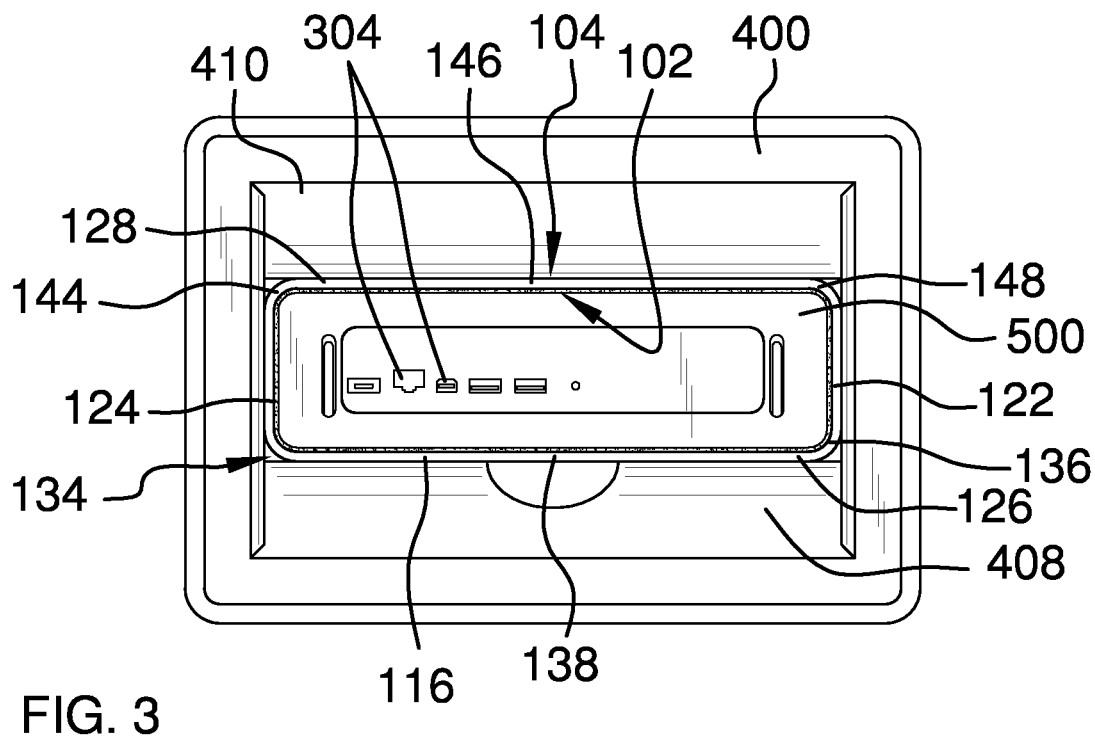
FIG. 3 is a top view.
Figure 4:
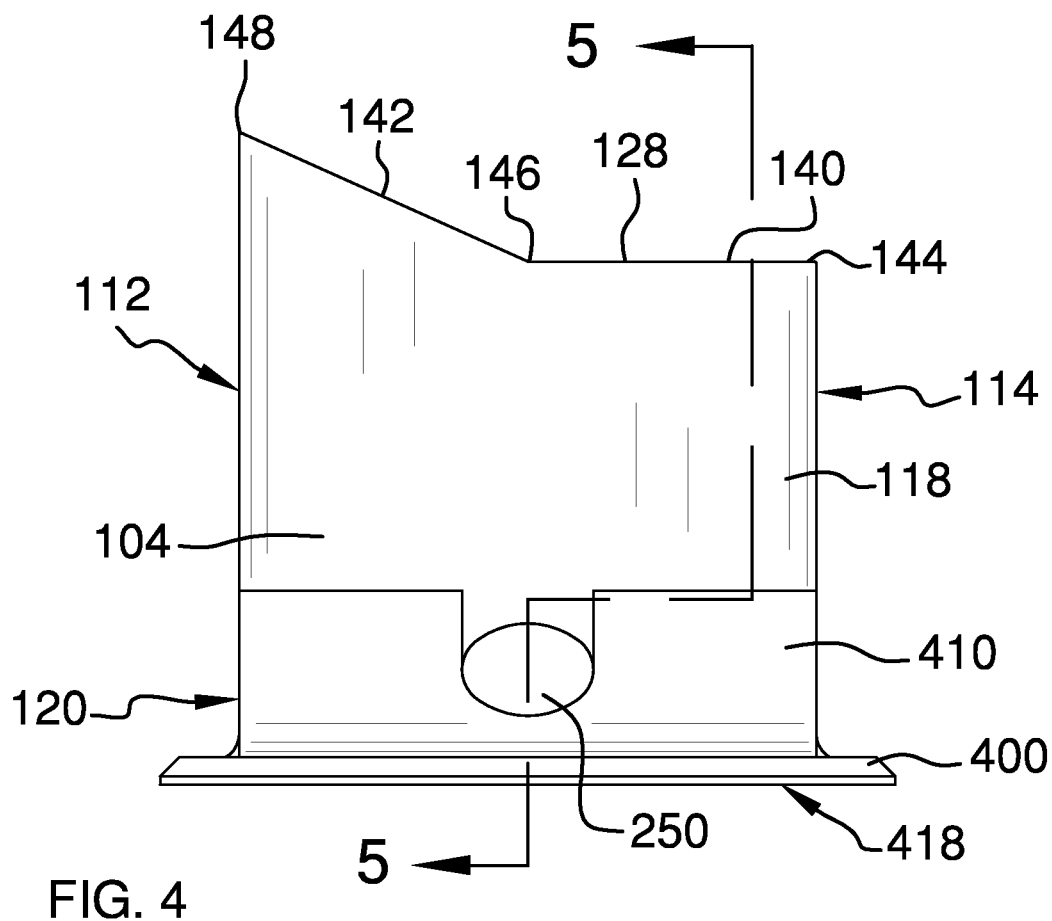
FIG. 4 is a front view.
Figure 5:
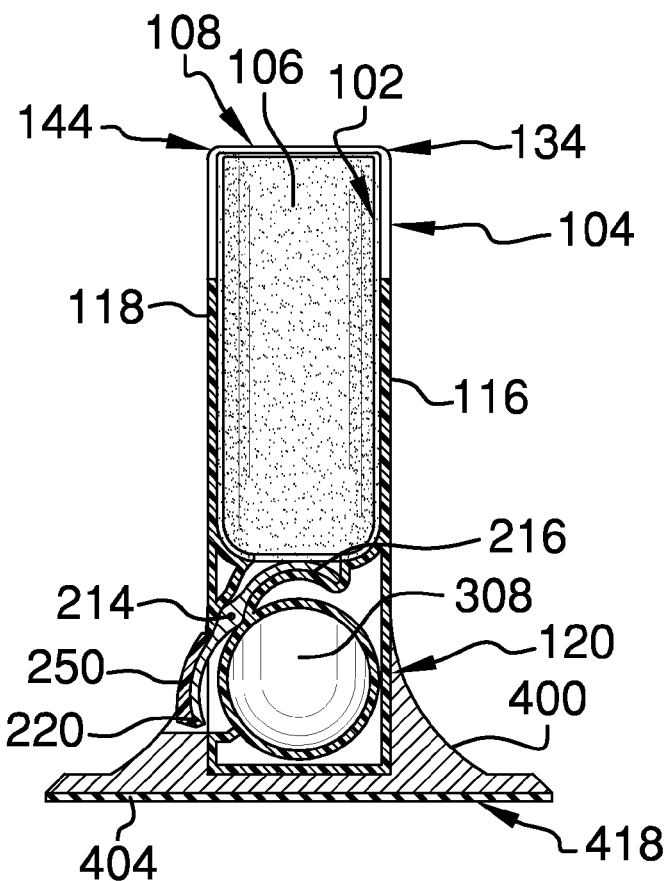
FIG. 5 is a cross sectional view taken along the line 5-5 of FIG. 4.
Figure 6:
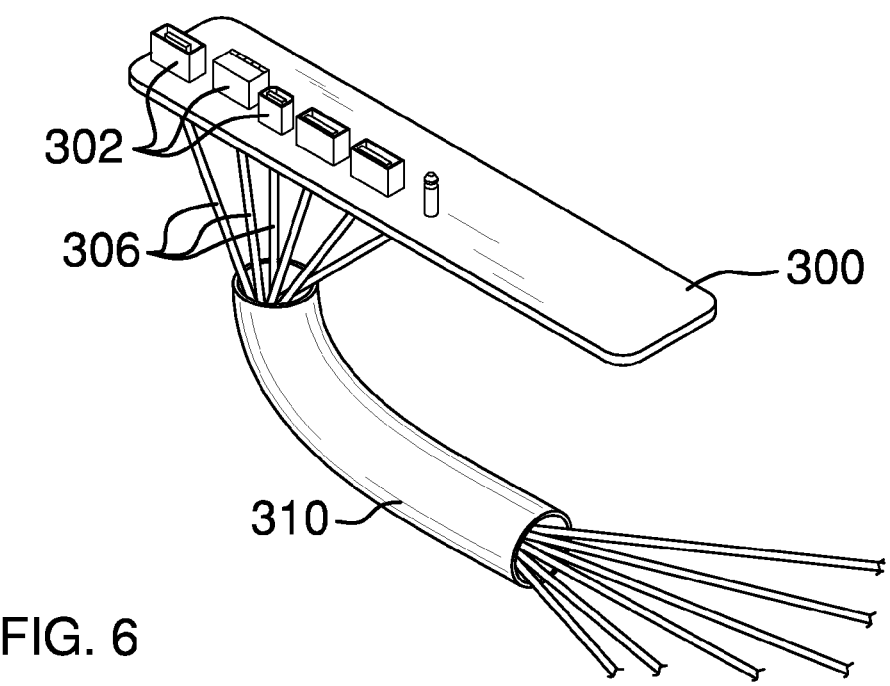
FIG. 6 is a detail of a contact plate and the arrangement and distribution of wires therefrom.

With reference now to the drawings, and in particular FIGS. 1 through 6 thereof, example of the instant docking station for a Macintosh laptop computer employing the principles and concepts of the present docking station for a Macintosh laptop computer and generally designated by the reference number 10 will be described.

Referring to FIGS. 1 through 6 a preferred embodiment of the present docking station for a Macintosh laptop computer 10 is illustrated. The present docking station for a Macintosh laptop computer 10 includes a receiving sleeve 100, a spring lever 200, a contact plate 300, and a base plate 400.

The receiving sleeve 100 is designed to received a Macintosh laptop 500 vertically inserted therein, the Macintosh laptop 500 inserted with a side 510 down facing. The receiving sleeve 100 has an interior surface 102, an exterior surface 104, an interior cavity 106, an open top end 108, a base side 110, a front side 112, a rear side 114, a left side 116 and a right side 118. The interior surface 102 is lined with a felt or fabric layer to protect the finish of the laptop 500 inserted into the interior cavity 106.

The base side 110 is a parallelepiped member horizontally disposed perpendicular to the front 112, rear 114, left 116 and right 118 sides. The base side 110 continuously connects the front 112, rear 114, left 116 and right 118 sides at a bottom end 120 of the receiving sleeve 100. The base side 110 thusly defines the lower boundary of the interior cavity 106 of the receiving sleeve 100 disposed opposite the open end 108.

The front edge 122 is disposed in a horizontal plane parallel with the base side 110. The rear edge 124 is disposed in a horizontal plane parallel with the base side 110. The left 126 and right 128 edges occupy planes perpendicular to the front 122 and rear 124 edges. The left edge 126 includes a first horizontal section 130 and a first diagonal section 132. The first horizontal section 130 is disposed in a plane parallel with the base side 110. The first horizontal section 130 connects to the rear edge 124 at a first rear corner 134. The first horizontal section 130 connects to the first diagonal section 132 at a first midpoint 136. The first diagonal section 132 rises from the first midpoint 136 along an obtuse angle with respect to the first horizontal section 130, the first diagonal section 132 connecting to the front edge 122 at a first front corner 138. The right edge 128 includes a second horizontal section 140 and a second diagonal section 142. The second horizontal section 140 is disposed in a plane parallel with the base side 110. The second horizontal section 140 connects to the rear edge 124 at a second rear corner 144. The second horizontal section 140 connects to the second diagonal section 142 at a second midpoint 146. The second diagonal section 142 rises from the second midpoint 146 along an obtuse angle with respect to the second horizontal section 140, the second diagonal section 142 connecting to the front edge 122 at a second front corner 148. The front side 112 is thus taller in height than the rear side 114 to encase the laptop side inserted into the receiving sleeve more securely than would be the case with a front side 112 and a rear side 114 having equal heights.

The spring lever 200 is disposed horizontally within the interior cavity 106. The laptop 500 engages the spring lever 200 when the laptop 500 is inserted into the receiving sleeve 100.

The spring lever 200 is a cylindrical member 202 disposed horizontally within the interior cavity 106 of the receiving sleeve 100. The spring lever 200 is disposed proximal the interior surface 102 of the right side 118 of the receiving sleeve 100. The spring lever 200 has a front tip 204 and a rear tip 206 connected to a first 208 and second 210 pin respectively. The first 208 and second 210 pin connect to a first 212 and second 214 pivot point, said first 212 and second 214 pivot points disposed upon the interior surface 102 of the front 112 and rear 114 sides respectively. The spring lever 200 has a first 216 and second 218 finger. The first finger 216 is radially projected from front tip 204. The second finger 218 is radially projected from the rear tip 206.

The first 216 and second 218 fingers are arced projections that rise upwardly from the spring lever 200 cylindrical member 202 into the interior cavity 106 of the receiving sleeve 100. The first 216 and second 218 fingers are convexly disposed with respect to the receiving sleeve 100 open end 108.

The laptop 500 side 510 contacts the first 216 and second 218 fingers when the laptop 500 is inserted into the receiving sleeve 100. The weight of the laptop 500 pushes the first 216 and second 218 finger downward, the first 216 and second 218 fingers rotate the spring lever 200 cylindrical member 202 in a counterclockwise direction with respect to the front side 112 of the receiving sleeve 100.

The spring lever 200 cylindrical member 202 has a third finger 220 radially projecting therefrom, the third finger 220 centrally disposed along the cylindrical member 202, the third finger 220 oriented between the spring lever 200 and the base side 110.

When the cylindrical member 202 is rotated by the first 216 and second 218 fingers, the third finger 220 is rotated upward to engage an eject button 250 disposed on the receiving sleeve 100 right side 118.

The eject button 250 is thusly engaged when the laptop 500 is inserted into the receiving sleeve 100. When the eject button 250 is depressed, the third finger 220 is rotated downward, the cylindrical member 202 of the spring lever 200 rotates clockwise with respect to the front side 112 and the first 216 and second 218 fingers are raised. The laptop 500 is thusly raised when the eject button 250 is depressed.

The contact plate 300 is a parallelepiped member horizontally disposed within the interior cavity 106 of the receiving sleeve 100 parallel with, and proximal to, the base side 110 interior surface 102.

The contact plate 300 has a plurality of connecting heads 302 disposed thereon. The connecting heads 302 include connecting heads 302 for each of a plurality of data ports 304 of a Macintosh laptop computer 500.

The contact plate 300 connecting heads 302 are configurable to the data ports 304 of a Macintosh laptop computer 500.

The contact plate 300 interconnects with the laptop 500 data ports 304 when the laptop 500 is inserted into the receiving sleeve 100. The spring lever 200 slows the descent of the laptop 500 and smoothly engenders contact between the laptop 500 data ports 304 and the connecting heads 302.

A plurality of wires 306—which wires 306 interconnect the connecting heads 302 and the peripherals connectable to the laptop 500 by means of the docking station 10—is collected into a single wrap 310 which tidily distributes said wires 306 out the rear side 114 of the receiving sleeve 100 through a rear opening 308 disposed proximal to the bottom end 120 of the receiving sleeve 100.

The receiving sleeve 100 is removably slotted into the base plate 400.

The base plate 400 includes a metal catch 402 and a rubber pad 404. The metal catch 402 is a receptacle for the receiving sleeve 100, the metal catch 402 securely upholds the receiving sleeve 100. The metal catch 402 has a recessed center 406, the recessed center 406 of the same dimensions as the base side 110. The base side 110 of the receiving sleeve 100 is placed into the recessed center 406 of the base plate 400.

A first side support 408 and a second side support 410 adorn the base plate 400. The first and second side supports 408, 410 have a vertical first inner face 412 and a second inner face 414 respectively. The first and second inner faces 412, 414 are disposed opposite each other across the recessed center 406. A notch 415 is centrally disposed on the second side support 410. The notch 415 is configured to receive the eject button 250 therethrough.

The first inner face 412 is in continuous contact with the bottom end 120 of the receiving sleeve 100 left side 116. The second inner face 414 is in continuous contact with the bottom end 120 of the receiving sleeve 100 right side 118.

The metal catch 402 is secured atop the rubber pad 404. A plurality of fasteners 416 fasten the rubber pad 404 to an underside 418 of the base plate 400 and then the base plate 400 to the base side 110 of the receiving sleeve 100. In the preferred embodiment illustrated in this specification, the plurality of fasteners 416 includes four screws.

The present docking station for a Macintosh laptop computer accommodates varying models of Macintosh laptop computers.

What is claimed is:

1. A docking station for a Macintosh laptop computer, the docking station comprising:

a receiving sleeve comprising an interior surface, an exterior surface, an interior cavity, an open top end, a base side, a front side, a rear side, a left side, a right side;
a spring lever disposed within the interior cavity of the receiving sleeve, said spring lever comprising:
a cylindrical member horizontally rotationally disposed within the receiving sleeve of the interior cavity, the cylindrical member having a front tip and a rear tip;
a first finger and a second finger radially projecting from the cylindrical member first and second tip, respectively;
a third finger radially projecting from the cylindrical member, the third finger centrally disposed upon the cylindrical member in an opposite direction from the first finger and the second finger;
an eject button disposed on the receiving sleeve exterior surface;
wherein the eject button operationally communicates with the spring lever;
a parallelepiped contact plate horizontally disposed within the receiving sleeve interior cavity proximal to the base side interior surface;
a plurality of connecting heads disposed on the contact plate, the connecting heads configured to interconnect with a series of data ports disposed on a side of a Macintosh laptop computer;
a base plate comprising:
a catch;
a pad attached to an underside of the catch;
wherein the catch removably receives the receiving sleeve therein;
wherein activation of the eject button activates the spring lever; and
wherein activation of the spring lever releases the connecting heads from the data ports;
wherein the side of the laptop computer operationally engages the first, the second finger, and the third fingers in a first position and alternately in a second position;
wherein the connecting heads and the data ports operationally engage and alternately disengage in the first position and the second position, respectively;
wherein the third finger operationally engages the eject button in an outward position upon the operational engagement of the connecting heads and the data ports; and
wherein the eject button operationally engages the third finger in the first position upon the disengagement of the connecting heads and the data ports.

2. The docking station of claim 1 wherein the contact heads are interchangeable upon the contact plate.

3. The docking station of claim 2 further comprising:
a rear opening disposed in the receiving sleeve rear side;
wherein the rear opening is configured to removably receive a plurality of wires in operational communication with the connecting heads therethough.

4. The docking station of claim 3 further comprising a notch centrally disposed on the second side support, wherein the notch is configured to receive the eject button therethrough.

5. The docking station of claim 4 wherein the catch is metal;
wherein the pad is rubber;
wherein the interior surface has a lining.

6. The docking station of claim 5 wherein the lining is felt and alternately fabric.

* * * * *